(12) United States Patent
Chiasson et al.

(10) Patent No.: US 6,748,148 B2
(45) Date of Patent: Jun. 8, 2004

(54) OPTICAL FIBER RIBBONS HAVING A NON-UNIFORM THICKNESS AND/OR PREFERENTIAL TEAR PORTIONS

(75) Inventors: David W. Chiasson, Hickory, NC (US); Carl M. Whisnant, Jr., Hickory, NC (US); Rodney D. Cline, Hickory, NC (US); Shail K. Moorjani, Conover, NC (US); Julie A. Chalk, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 15 days.

(21) Appl. No.: 10/159,730

(22) Filed: May 31, 2002

(65) Prior Publication Data

US 2003/0223713 A1 Dec. 4, 2003

(51) Int. Cl.[7] .................. G02B 6/44
(52) U.S. Cl. .................. 385/114
(58) Field of Search .................. 385/100, 114

(56) References Cited

U.S. PATENT DOCUMENTS

| | | | |
|---|---|---|---|
| 4,547,040 A | 10/1985 | Yamamoto et al. | 350/96.34 |
| 4,653,852 A | 3/1987 | Suzuki et al. | 350/96.33 |
| 4,752,112 A | 6/1988 | Mayr | 350/96.23 |
| 4,861,135 A | 8/1989 | Rohner et al. | 350/96.23 |
| 4,900,126 A | 2/1990 | Jackson et al. | 350/46.23 |
| 5,442,722 A | 8/1995 | DeCarlo | 385/114 |
| 5,457,762 A | 10/1995 | Lochkovic et al. | 385/114 |
| 5,524,164 A | 6/1996 | Hattori et al. | 385/114 |
| 5,598,498 A | 1/1997 | Comezzi | 385/114 |
| 5,673,352 A | 9/1997 | Bauer et al. | 385/114 |
| 5,717,805 A | 2/1998 | Stulpin | 385/114 |
| 5,761,363 A | 6/1998 | Mills | 385/114 |
| 5,933,559 A | 8/1999 | Petisce | 385/114 |
| 5,970,196 A | 10/1999 | Greveling et al. | 385/114 |
| 5,982,968 A | 11/1999 | Stulpin | 385/114 |
| 6,018,605 A | 1/2000 | Mills et al. | 385/114 |
| 6,028,976 A | 2/2000 | Sato et al. | 385/114 |
| 6,097,866 A | 8/2000 | Yang et al. | 385/114 |
| 6,253,013 B1 | 6/2001 | Lochkovic et al. | 385/114 |
| 6,309,567 B1 | 10/2001 | Okuno et al. | 264/1.27 |
| 6,337,941 B1 | 1/2002 | Yang et al. | 385/114 |
| 6,381,390 B1 | 4/2002 | Hutton et al. | 385/114 |

FOREIGN PATENT DOCUMENTS

| | | | | |
|---|---|---|---|---|
| EP | 0843187 A1 | 5/1998 | | G02B/6/44 |
| EP | 0856761 A1 | 8/1998 | | G02B/6/44 |

(List continued on next page.)

OTHER PUBLICATIONS

N. Andrew Punch, Jr., Shail K. Moorjani, Steven T. Bissell, and Karen E. Williams, Craft–Friendly 24–Fiber Ribbon Design, IWCS 1999, pp. 72–78.
R. S. Wagman, G. A. Lochkovic, K. T. White, "Component Optimization for Slotted Core Cables Using 8–Fiber Ribbons", IWCS 1995, pp. 472–478.
2002/025128A1, Feb. 28, 2002, Hwang.

*Primary Examiner*—Tulsidas C. Patel
(74) *Attorney, Agent, or Firm*—Michael J. Carroll, Jr.

(57) ABSTRACT

A fiber optic ribbon includes a plurality of optical fibers arranged in a generally planar configuration having a primary matrix generally contacting optical fibers along a longitudinal axis forming an elongate structure. In one embodiment, the primary matrix has a cross-section with a non-uniform thickness, for example, an end portion with a generally bulbous shape. The fiber optic ribbon is useful as a subunit having a secondary matrix in contact therewith. The secondary matrix has a non-uniform thickness, thereby providing a fiber optic ribbon with preferential tear portions to aid separation of the ribbon into subunits. Other embodiments include a fiber optic ribbon with subunits having a secondary matrix with recessed portions to aid in the separation of the subunits.

40 Claims, 3 Drawing Sheets

FOREIGN PATENT DOCUMENTS

| | | | | |
|---|---|---|---|---|
| JP | 1-138517 | 5/1989 | ............ | G02B/6/44 |
| JP | 1-138518 | 5/1989 | ............ | G02B/6/44 |
| JP | 1-251005 | 10/1989 | ............ | G02B/6/44 |
| JP | 07120645 A | 5/1995 | ............ | G02B/6/44 |
| JP | 08129122 A | 5/1996 | ............ | G02B/6/44 |
| JP | 08262292 A | 10/1996 | ............ | G02B/6/44 |
| JP | 09113773 A | 5/1997 | ............ | G02B/6/44 |
| JP | 09197213 A | 7/1997 | ............ | G02B/6/44 |
| JP | 09218328 A | 8/1997 | ............ | G02B/6/44 |
| WO | WO94/23323 | 10/1994 | ............ | G02B/6/44 |
| WO | WO97/05515 | 2/1997 | ............ | G02B/6/44 |

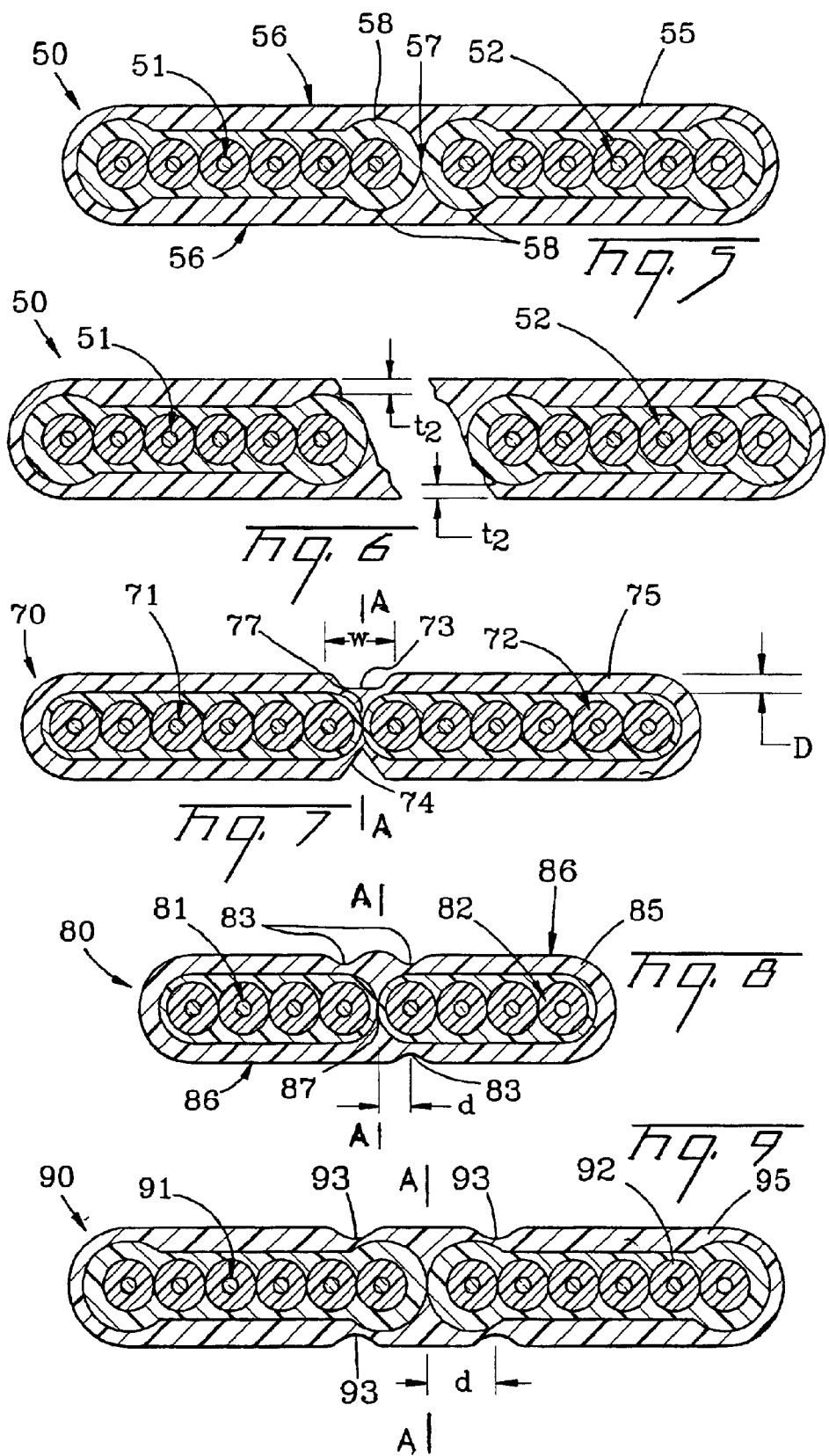

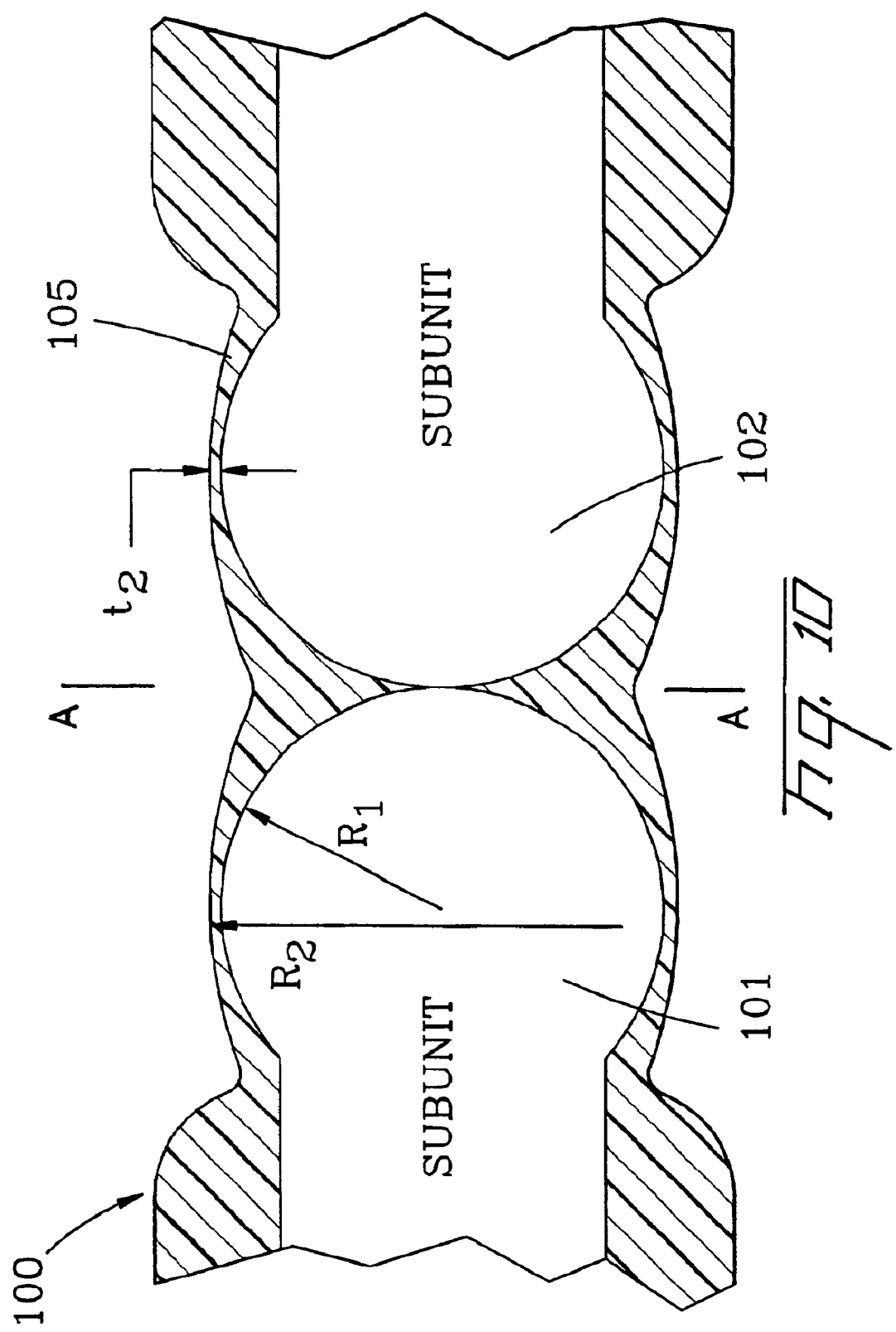

US 6,748,148 B2

OPTICAL FIBER RIBBONS HAVING A NON-UNIFORM THICKNESS AND/OR PREFERENTIAL TEAR PORTIONS

FIELD OF THE INVENTION

The present invention relates generally to fiber optic ribbons. More specifically, the invention relates to fiber optic ribbons having non-uniform shapes and/or preferential tear portions for separating the fiber optic ribbon into subunits.

BACKGROUND OF THE INVENTION

Fiber optic ribbons include optical waveguides such as optical fibers that transmit optical signals, for example, voice, video, and/or data information. Fiber optic cables using optical fiber ribbons can result in a relatively high optical fiber-density. Fiber optic ribbon configurations can be generally classified into two general categories. Namely, fiber optic ribbons with subunits and those without. A fiber optic ribbon with a subunit configuration, for example, includes at least one optical fiber surrounded by a primary matrix forming a first subunit, and a second subunit having a similar construction, which are contacted and/or encapsulated by a secondary matrix. On the other hand, fiber optic ribbons without subunits generally have a plurality of optical fibers surrounded by a single matrix material.

Optical fiber ribbons should not be confused with micro-cables that, for example, have a strength member and a jacket. For instance, U.S. Pat. No. 5,673,352 discloses a micro-cable having a core structure and a jacket. The core structure requires that at least one optical fiber is positioned between longitudinally extending strength members, both of which are embedded in a buffer material. The jacket protects the core structure and the material is selected to have good adhesion to the buffer material and be abrasion resistant. Additionally, the strength members are required to have a larger diameter than the diameter of the optical fiber, thereby absorbing crushing forces that are applied to the cable.

On the other hand, optical fiber ribbons generally have a plurality of adjacent optical fibers arranged in a generally planar array forming a relatively high optical fiber density. Optical fiber ribbons without subunits can present problems for the craft. For example, when separating these optical fiber ribbons into optical fiber subsets, the craft must use expensive precision tools. Moreover, connectorization/splice procedures can require inventories of specialized splice and closure units/tools for the various subsets of optical fibers. Where the craft elects to separate the optical fiber ribbon into subsets by hand, or with a tool lacking adequate precision, stray optical fibers and/or damage to the optical fibers can result. Stray optical fibers can cause problems in optical ribbon connectorization, organization, stripping, and splicing. Additionally, damage to the optical fibers is undesirable and can render the optical fiber inoperable for its intended purpose.

However, there are fiber optic ribbon configurations that attempt to aid the separation of fiber optic ribbons without using subunits. For example, U.S. Pat. No. 5,982,968 requires an optical fiber ribbon of uniform thickness having V-shaped stress concentrations in the matrix material that extend along the longitudinal axis of the fiber optic ribbon. V-shaped stress concentrations can be located across from each other on the planar surfaces of the fiber optic ribbon, thereby aiding the separation of the fiber optic ribbon into subsets. However, the '968 patent requires a wider fiber optic ribbon because additional matrix material is required adjacent to the optical fibers near the V-shaped stress concentrations to avoid stray optical fibers after separation. A wider ribbon requires more matrix material and decreases the optical fiber density. Another embodiment of the patent requires applying a thin layer of a first matrix material around optical fibers to improve geometry control such as planarity of the optical fibers. Then V-shaped stress concentrations are formed in a second matrix applied over the first matrix material, thereby allowing separation of the subsets at the stress concentrations.

Another example of a separable fiber optic ribbon is described in U.S. Pat. No. 5,970,196. More specifically, the '196 patent requires a pair of removable sections positioned in V-shaped notches located across from each other on opposite sides of the planar surfaces of an optical fiber ribbon. The removable sections are positioned between adjacent interior optical fibers of the optical fiber ribbon to facilitate the separation of the optical fiber ribbon into subsets at the V-shaped notches. The removable sections can either be flush with the planar surfaces of the optical fiber ribbon, or they may protrude therefrom. These known fiber optic ribbons have several disadvantages. For example, they can be more expensive and difficult to manufacture. Additionally, from an operability standpoint, the V-shaped stress concentrations and/or V-shaped notches can undesirably affect the robustness of the optical fiber ribbon and/or induce microbending in the optical fibers.

Fiber optic ribbons that employ subunits to aid separation generally do not encounter these problems; however, they can have other problems. A conventional optical fiber ribbon 1 employing subunits encapsulated in a secondary matrix is shown in FIG. 1. Optical fiber ribbons having subunits can have several advantages, for example, improved separation, and avoidance of stray fiber occurrences. In particular, optical fiber ribbon 1 includes a pair of conventional subunits 2 having optical fibers 3 encapsulated in a primary matrix 5, which are then encapsulated in a secondary matrix 4. The thickness T1 of primary matrix 5 is continuous and uniform. Likewise, the thickness t1 of the secondary matrix 4 covering the planar portions of subunits 2 is continuous and uniform. For example, subunit 2 can include six 250 $\mu$m optical fibers 3 disposed in primary matrix 5 having an overall uniform thickness T1 of 310 $\mu$m and secondary matrix 4 has a thickness t1 of 10 $\mu$m for an overall fiber optic ribbon thickness T2 of 330 $\mu$m.

However, conventional optical fiber ribbon 1 has disadvantages. For example, one concern is the potential formation of wings W (FIG. 1) during hand separation of subunits 2. Wings W can be cause by, for example, a lack of sufficient adhesion between common matrix 4 and subunit matrix 5 and/or random fracturing of the secondary matrix during separation. The existence of wings W can negatively affect, for example, optical ribbon organization, connectorization, stripping, and/or splicing operations by the craft. Additionally, wings W can cause problems with ribbon identification markings, or compatibility of the subunit with ribbon handling tools, for example, thermal strippers, splice chucks, and fusion splicers.

SUMMARY OF THE INVENTION

The present invention is directed to a fiber optic ribbon including a plurality of optical fibers arranged in a generally planar configuration with a primary matrix. The primary matrix generally contacts and inhibits relative movement between the plurality of optical fibers along a longitudinal axis forming an elongate structure. The primary matrix has a cross-section with a non-uniform thickness having a first end portion and a medial portion. The first end portion having a generally bulbous shape having a thickness, and the medial portion has a thickness, the thickness of the first end portion being greater than the thickness of the medial portion.

The present invention is further directed to a fiber optic ribbon including a first subunit, a second subunit, and a secondary matrix. The first subunit includes a plurality of optical fibers being surrounded by a first primary matrix having a non-uniform thickness. The second subunit includes a plurality of optical fibers being surrounded by a second primary matrix. The secondary matrix contacts portions of the first and second subunits and is dimensioned so as to provide a pair of opposing generally flat planar surfaces. The secondary matrix has a local minimum thickness adjacent to the non-uniform thickness of the first subunit, wherein during separation of the subunits the secondary matrix fractures adjacent to the local minimum thickness.

The present invention is also directed to a fiber optic ribbon including a first subunit, a second subunit, and a secondary matrix. The first subunit includes a first plurality of optical fibers being contacted by a first primary matrix having a first end portion. The second subunit includes a second plurality of optical fibers being contacted by a second primary matrix having a first end portion. The first and second subunits being generally aligned along a plane having a secondary matrix contacting portions of the first and second subunits. The secondary matrix has a cross-section with a non-uniform thickness and a recessed portion. The recessed portion being adjacent to an interface between the first end portion of the first subunit and the first end portion of the second subunit. The recessed portion defining a preferential tear portion.

The present invention is still further directed to a fiber optic ribbon including a plurality of optical fibers being arranged in a generally planar configuration having a primary matrix generally contacting and inhibiting relative movement between the plurality of optical fibers along a longitudinal axis. The primary matrix having a first end portion, a second end portion, and a medial portion with a cross-section with a non-uniform thickness. The thickness of the first end portion being greater than the thickness of the medial portion.

The present invention is also directed to a fiber optic ribbon including a first subunit, a second subunit, and a secondary matrix. The first subunit includes a plurality of optical fibers being surrounded by a first primary matrix. The second subunit includes a plurality of optical fibers being surrounded by a second primary matrix. The secondary matrix contacting portions of the first and second subunits and has at least one generally planar surface. An interface is defined between the first end portion of the first subunit and the first end portion of the second subunit. The interface having an interface axis that is generally perpendicular to the generally planar surface of the secondary matrix and passes through the interface. The secondary matrix has at least two recessed portions being on opposite sides of the interface axis.

Additionally, the present invention is directed to a fiber optic ribbon including a first subunit, a second subunit, and a secondary matrix. The first subunit includes a plurality of optical fibers, the plurality of optical fibers being surrounded by a first primary matrix. The second subunit includes a plurality of optical fibers being surrounded by a second primary matrix. The secondary matrix contacts portions of the first and second subunits and has at least one generally planar surface. An interface is defined between the first end portion of the first subunit and the first end portion of the second subunit. An interface axis passes through the interface and is generally perpendicular to the generally planar surface of the secondary matrix. The secondary matrix having at least one recessed portion being generally symmetrical about the interface axis.

BRIEF DESCRIPTION OF THE FIGS.

FIG. 5 is a cross-sectional view of another fiber optic ribbon according to the present invention.

FIG. 6 is a cross-sectional view of the fiber optic ribbon of FIG. 5 after separation into subunits.

FIG. 7 is a cross-sectional view of another fiber optic ribbon according to the present invention.

FIG. 8 is a cross-sectional view of another fiber optic ribbon according to the present invention.

FIG. 9 is a cross-sectional view of another fiber optic ribbon according to the present invention.

FIG. 10 is a schematic, partial cross-sectional view of another fiber optic ribbon according to the present invention.

DETAILED DESCRIPTION OF THE INVENTION

Figure 1:
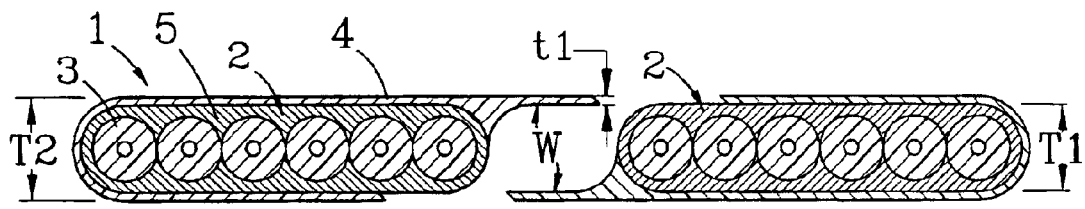
FIG. 1 is a cross-sectional view of a conventional optical fiber ribbon according to the background of the present invention.
Figure 2:
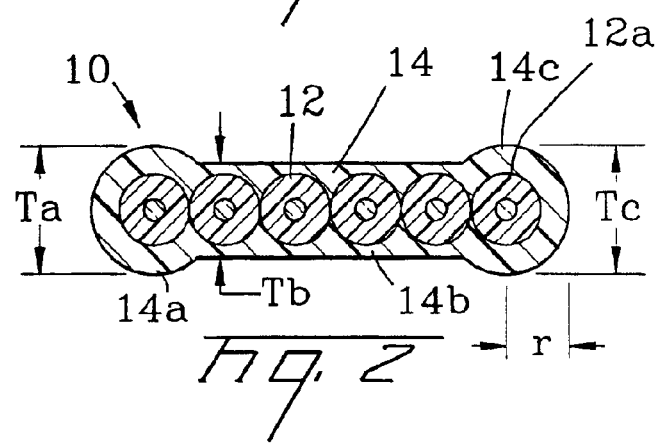
FIG. 2 is a cross-sectional view of a fiber optic ribbon according to one embodiment of the present invention.

Illustrated in FIG. 2 is a fiber optic ribbon 10 according to the present invention. Fiber optic ribbon 10 (hereinafter ribbon) includes a plurality of optical waveguides, for example, optical fibers 12 arranged in a generally planar configuration with a primary matrix 14 forming an elongate structure. Ribbon 10 can, for example, be used as a stand-alone ribbon, a portion of a ribbon stack, or as a subunit of a ribbon. Primary matrix 14 generally contacts optical fibers 12 and may encapsulate the same, thereby providing a robust structure for processing and handling. Primary matrix 14 generally fixes adjacent optical fibers together in an elongate structure, thereby inhibiting relative movement therebetween. Primary matrix 14 includes a first end 14a, a medial portion 14b, and a second end 14c. Additionally, primary matrix 14 has a cross-section having a non-uniform thickness.

In this embodiment, first end portion 14a has a thickness $T_a$ and second end portion 14c has a thickness $T_c$, which are both greater than a thickness $T_b$ of medial portion 14b. For example, thickness $T_a$ is about 5 μm or greater than thickness $T_b$; however, other suitable dimensions can be used. More particularly, first and second end portions 14a, 14c both have a generally bulbous shape; however, other suitable shapes can be used such as angular or elliptical. As used herein, bulbous shape means that an end portion of the ribbon has a thickness that is greater than the largest thickness of a medial portion of the ribbon. Preferably, the largest thickness is generally adjacent to edge fiber 12a, generally at a range r of about one-half to about one optical fiber diameter from the edge of the matrix, however, other suitable ranges can be used.

The present invention should not be confused with conventional ribbons having undulations across their cross-sections surfaces due to manufacturing variances. These undulations can cause variations in the conventional ribbon thickness at random locations, rather than, for example, predetermined shapes. For example, the thickness of the conventional ribbon can be 310±3 μm at random locations across the cross-section. On the other hand, ribbons according to the present invention can have, for example, a non-uniform thickness that increases or decreases at predetermined locations to aid separation performance.

In one embodiment, optical fibers 12 are a plurality of single-mode optical fibers; however, other types or configurations of optical fibers can be used. For example, optical fibers 12 can be multi-mode, pure-mode, erbium doped, polarization-maintaining fiber, other suitable types of light waveguides, and/or combinations thereof. For instance, each optical fiber 12 can include a silica-based core that is operative to transmit light and is surrounded by a silica-based cladding having a lower index of refraction than the core. Additionally, one or more coatings can be applied to optical fiber 12. For example, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. However, optical fibers used in ribbons of the present invention generally are not tight-buffered. Suitable optical fibers are commercially available from Corning Incorporated of Corning, N.Y.

Primary matrix 14 can be, for example, a radiation curable material or a polymeric material; however, other suitable materials can be used. As known to one skilled in the art, radiation curable materials undergo a transition from a liquid to a solid when irradiated with predetermined radiation wavelengths. Before curing, the radiation curable material includes a mixture of formulations of, for example, liquid monomers, oligomer "backbones" with acrylate functional groups, photoinitiators, and other additives. Typical photoinitiators function by: absorbing energy radiated by the radiation source; fragmenting into reactive species; and then initiating a polymerization/hardening reaction of the monomers and oligomers. Generally, as a result of irradiation, a cured solid network of cross-linking is formed between the monomers and oligomers, which may include fugitive components. Stated another way, the photoinitiator begins a chemical reaction that promotes the solidification of the liquid matrix into a generally solid film having modulus characteristics.

One aspect of the curing process is the reaction of a photoinitiator in response to radiation exposure. A photoinitiator has an inherent absorption spectrum that is measured in terms of absorbance as a function of radiation wavelength. Each photoinitiator has a characteristic photoactive region, i.e., a photoactive wavelength range typically measured in nanometers (nm). For example, commercially available photoinitiators can have a photoactive wavelength range in the vacuum ultra-violet (160–220 nm), ultra-violet (220–400 nm), or visible light (400–700 nm) wavelength ranges.

The resulting modulus of radiation curable materials can be controlled by factors such as radiation intensity and cure time. The radiation dose, i.e., the radiant energy arriving at a surface per unit area is inversely proportional to the line speed, i.e., the speed the radiation curable moves past the radiation source. The light dose is the integral of radiated power as a function of time. In other words, all else being equal, the faster the line speed, the higher the radiation intensity must be to achieve adequate curing. After a radiation curable material has been fully irradiated, the material is said to be cured. Curing occurs in the radiation curable material from the side facing the radiation source down or away from the source. Because portions of the material closer to the radiation source can block radiation from reaching non-cured portions of the material, a cure gradient can be established. Depending on the amount of incident radiation, a cured material may exhibit different degrees of curing. Moreover, the degrees of curing in a material can have distinct modulus characteristic associated therewith. Conversely, radiation sources can be positioned so that the material has a relatively uniform cure.

Thus, the degree of cure affects the mechanical characteristics through the cross-link density of the radiation curable material. For example, a significantly cured material can be defined as one with a high cross-link density for that material, which is, for example, too brittle. Further, an undercured material may be defined as one having a low cross-link density, and can be too soft, possibly having a relatively high coefficient of friction (COF) that causes an undesirable level of ribbon friction. The cured UV material has a modulus, for example, in the range of about 50 MPa to about 1500 MPa depending on the radiation dose. Different modulus values can provide varying degrees of performance with respect to, for example, hand separability and robustness of the ribbons of the present invention.

In one embodiment, a UV curable material is used for primary matrix 14. For example, the UV curable material is a polyurethane acrylate resin commercially available from DSM Desotech Inc. of Elgin Ill. such as 950-706. Alternatively, other suitable UV materials can be used, for example, polyester acrylate resin commercially available from Borden Chemical, Inc. of Columbus, Ohio. Additionally, thermoplastic materials such as polypropylene can be used as a matrix material.

Figure 3:
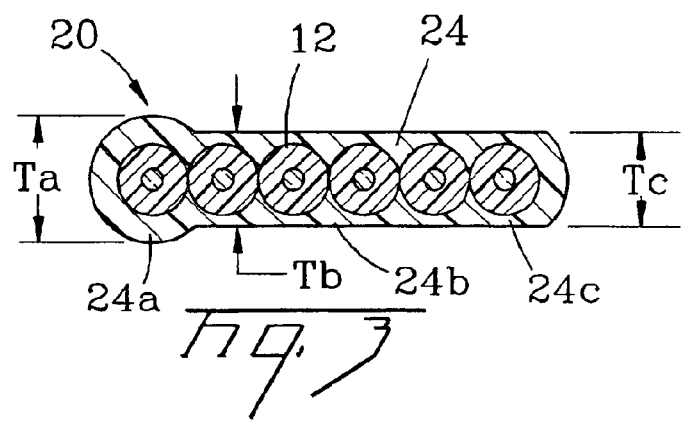
FIG. 3 is a cross-sectional view of another fiber optic ribbon according to the present invention.

FIG. 3 illustrates a ribbon 20 another embodiment of the present invention that is similar to ribbon 10. Ribbon 20 includes a plurality of optical waveguides, for example, optical fibers 12 arranged in a generally planar configuration with a primary matrix 24 forming an elongate structure. Primary matrix 24 generally contacts optical fibers 12 and may encapsulate the same, thereby providing a robust structure for processing and handling. Primary matrix 24 includes a cross-section having a non-uniform thickness having a first end 24a, a medial portion 24b, and a second end 24c. In this embodiment, first end portion 24a has a thickness $T_a$ and second end portion 24c has a thickness $T_c$, wherein thickness $T_a$ is greater than a thickness $T_b$ of medial portion 24b. More particularly, first end portion 24a, for example, has a generally bulbous shape; however, other suitable shapes can be used. Whereas, second end portion 24c can have a shape that is generally different than the shape of first end portion 24a. For example, as depicted, second end portion 24c has a generally round shape, however, other suitable shapes can be used such as flat or angled. When stacking a plurality of ribbons similar to ribbon 20, first end portion 24a can be placed on alternating sides of the ribbon stack to provide stack integrity. Additionally, stacking ribbons in this manner still allows the ribbons to move in at least two degrees of freedom when acted upon by forces, which can preserve optical performance.

Figure 4:
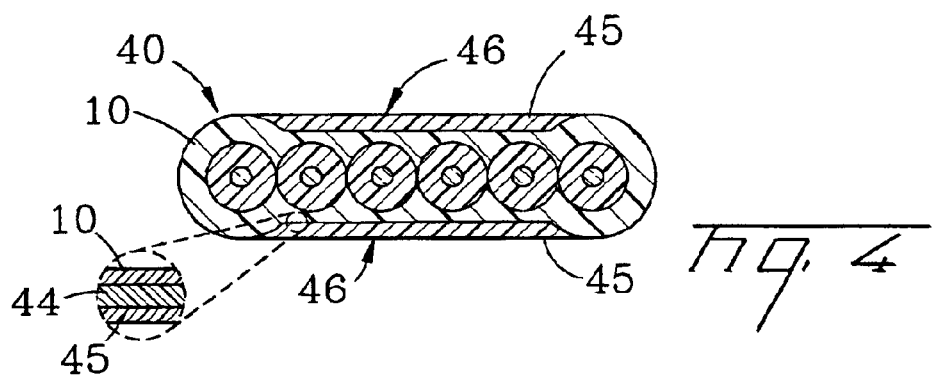
FIG. 4 is a cross-sectional view of the fiber optic ribbon subunit of FIG. 2 having a secondary matrix on portions thereof.

FIG. 4 depicts a ribbon 40. Ribbon 40 includes ribbon 10 with a secondary matrix 45 disposed on outwardly portions of primary matrix 14. Using more than one can have several advantages. For example, in one embodiment a thin primary matrix can be applied to ensure planarity of the optical fibers in the ribbon. Additionally, secondary matrix 45 can have several functions. For example, secondary matrix 45 can be used impart generally planar surfaces 46 to ribbon 40. Planar surfaces 46 can also provide stability when ribbon 40 is used as a portion of a ribbon stack. Additionally, secondary matrix 45 may also provide material characteristics that are different from primary matrix 14 such as adhesion, COF characteristics, or hardness. This can be accomplished, for example, by using a secondary matrix 45 material that is similar to primary matrix 14 with different processing characteristics such as cure characteristics, or by using a material that is different than primary matrix 14. Likewise, different portions of secondary matrix 45 can be different materials and/or have distinct material characteristics.

Illustratively, a first planar surface of secondary matrix 45 can have a predetermined COF, while the second planar surface can have a high adhesion to primary matrix 14. A predetermined COF on the planar surface allows the ribbon to relieve strain, for example, during bending of a stack of ribbons. While a high adhesion characteristic between the primary and secondary matrices can make for a generally robust ribbon. In other embodiments, the first and second planar surfaces can have the same characteristics, which may differ from the characteristics of the primary matrix. Additionally, as disclosed in U.S. Pat. No. 6,253,013, which is incorporated in its entirety herein by reference, an adhesion zone 44 (FIG. 4) can be used between primary matrix 14 and secondary matrix 45. For example, adhesion zone 44 is applied to primary matrix 14 using a Corona discharge treatment. Additionally, a marking indicia for identifying ribbon 40 can be printed either on primary matrix 14 or secondary matrix 45. In other embodiments, secondary matrix 45 can be used to identify ribbon 40. For example, secondary matrix 45 can be colored with a dye for identification of the ribbon.

Likewise, other suitable color combinations are possible for identifying individual ribbons. In one embodiment, primary matrix 14 may be a first color and secondary matrix 45 a second color. For example, multiple ribbons of a ribbon stack can have the same color primary matrix with each different ribbon have a secondary matrix with a different color. Thus, the craftsman could identify the stack as the blue stack and each individual ribbon within the blue stack. In other embodiments, the secondary matrix of the ribbons of the stack can be the same color, with the primary matrix of the individual ribbon having different colors. Thus, each ribbon can be identified from the side of the stack. In still other embodiments, the primary or secondary matrix can have stripes, or tracers, of suitable colors for use as identifying indicia.

FIG. 5 depicts ribbon 50 another embodiment according to the present invention. Ribbon 50 includes two ribbons such as ribbons 10 for use as a first subunit 51 and a second subunit 52. As used herein, subunit means a plurality of optical fibers having a discrete matrix material thereon. In other words, each subunit has its own individual matrix material thereon. Subunits should not be confused with subsets, which are optical fibers arranged as groups having a common matrix material. When subunits are separated the discrete matrix material generally remains intact on each subunit. However, ribbons according to the present invention can use other suitable types or numbers of ribbons as subunits.

A secondary matrix 55 contacts portions of subunits 51,52 and is generally dimensioned to provide a pair of opposing generally flat planar surfaces 56. Secondary matrix 55 can have material characteristics that are similar or different than primary matrix. For example, the primary matrix around the edge fibers of subunits 51,52 can be relatively soft to cushion the same and inhibit optical attenuation therein. The generally flat planar surfaces 56 allow ribbon 50 to be easily stacked to form a portion of a ribbon stack. However, other suitable shapes of secondary matrix 55 can be used. Using secondary matrix 55 allows separation of ribbon 50 at the interface 57 between the subunits 51,52 by, for example, hand. Subunits 51,52 preferably have a point contact at interface 57, thereby allowing secondary matrix 55 to flow between the subunits and forming a robust structure.

Additionally, ribbon 50 advantageously inhibits the formation of, for example, wings and/or stray optical fibers during separation. Ribbon 50 inhibits the formation of wings by having a preferential tear portion 58 in secondary matrix 55, rather than allowing random fracturing in secondary matrix 55. Specifically, preferential tear portion 58 is generally located at a point of local minimum thickness t2 (FIG. 6) generally adjacent to interface 57 of secondary matrix. In this case, the local minimum thickness t2 is formed by subunits 51,52 having non-uniform cross-sections. When secondary matrix 55 with generally flat planar surfaces 56 is applied over these non-uniform cross-sections, the thickness of secondary matrix 55 varies. For example, local minimum thickness t2 is about 2 $\mu$m, whereas portions of the secondary matrix 55 over the medial portions of subunits 51,52 have a thickness of about 10 $\mu$m. In other embodiments, local minimum thickness t2 can approach a value of essentially zero. Local minimum thickness t2 is a weak point, thereby allowing the fracture of secondary matrix 55 to begin and/or terminate at this point. Additionally, the minimum thickness can have other suitable dimensions or locations, but should allow the ribbon to have a suitable robustness and handleability. FIG. 6 illustrates the ribbon 50 after separation by hand into subunits. As depicted, formation of wings is inhibited according to the concepts of the present invention. Additionally, using suitable matrix characteristics such as elongation to break and/or a predetermined matrix modulus can enhance the preferential tear portion.

As depicted in FIG. 7, preferential tear portion can be accomplished with other suitable ribbon geometries. Ribbon 70 includes two subunits 71,72 and a secondary matrix 75. Secondary matrix 75 contacts and/or encapsulates subunits 71,72 thereby forming ribbon 70. Like secondary matrix 55 of ribbon 50, secondary matrix 75 has a thickness that varies generally adjacent to interface 77 between subunits 71,72. However, the varying thickness of secondary matrix 75 adjacent interface 77 is accomplished with subunits 71,72 having a generally uniform thickness. However, this ribbon configuration can be used in combination with subunits having a non-uniform thickness. In one embodiment, secondary matrix 75 has a recessed portion having a width w, for example, the recessed portion defining a concave portion 73 generally centered over interface 77. In other words, recessed portions are generally symmetrical about an interface axis A—A that passes through interface 77 and is generally perpendicular to the generally planar surfaces of ribbon 70. However, in other embodiments, the recessed portion can have other shapes such as indentation 74, widths, and/or locations. For purposes of illustration, the top and bottom of ribbon 70 have different configurations of the recessed portion; however, embodiments can have the same shaped recessed portions 73 on each side of interface 77. Concave portions 73 form a local minimum thickness in secondary matrix 75, which is a weak point that advantageously allows the fracture of secondary matrix 75 to begin and/or terminate at this point during, for example, hand separation.

In one embodiment, recessed portion 73 has a width w less than about 600 µm and a depth D of about 5 µm. However, other suitable dimensions can be used, for example, in other embodiments width w can be about 200 µm or greater and depth D can be about 5 µm or greater. Furthermore, the recessed portions 73 of the ribbon should be dimensioned to provide suitable robustness and handleability for the intended application of the ribbon.

Ribbon 80, another embodiment according to the concepts of the present invention, is illustrated in FIG. 8. Ribbon 80 includes a pair of subunits 81,82, each having a generally uniform thickness, and a secondary matrix 85 generally contacting and/or encapsulating subunits 81,82, thereby forming ribbon 80. Ribbon 80 has at least one recessed portion 83 and is similar to ribbon 70; however, recessed portions 83 are centered over an interface 87 between subunits 81,82. In this embodiment, recessed portions 83 have a generally concave shape that is offset at a distance d from interface 87. For example, distance d is between about 125 µm and about 300 µm, but other suitable distances can be used. Additionally, recessed portions 83 can have other shapes, widths, and/or depths. For purposes of illustration, the top and bottom of ribbon 80 have a different number of recessed portions 83. For example, recessed portions 83 on the top of ribbon 80 are generally symmetrical about interface axis A—A. However, other embodiments can have the same, or different, number of recessed portions 83 on each generally planar surface 86, for example, one, two, or more. Concave portions 83 form a local minimum thickness in secondary matrix 85, which is a weak point that advantageously allows the fracture of secondary matrix 75 to begin and/or terminate at this point during, for example, hand separation, thereby inhibiting the formation of wings.

Recessed portions 83 should be dimensioned to provide suitable robustness and handleability for the intended application of the ribbon. In this embodiment, centering recessed portions 83 of ribbon 80 at distance d from interface 87 provides increased robustness to ribbon 80. Specifically, centering recessed portions 83 from interface 87 improves the twist performance of ribbon 80. For example, subunits 81,82 of ribbon 80 are less likely to separate during normal handling of the ribbon.

FIG. 9 illustrates a ribbon 90 that is another embodiment of the present invention that is similar to ribbon 50. Ribbon 90 includes subunits 91,92 and a secondary matrix 95. Secondary matrix 95 contacts and/or encapsulates subunits 91,92 thereby forming ribbon 90. Subunits 91,92 have a non-uniform thickness and secondary matrix 95 has a plurality of recessed portions, like ribbon 70. In this embodiment, recessed portions 83 are on both sides of interface axis A—A and are generally symmetrical thereabout. The recessed portions are defined as a plurality of concave portions 93; however, recessed portions can have other shapes, widths, and/or locations. Concave portions 93 are generally located at a distance d from the interface of subunits 91,92. In this embodiment, distance d locates the center of concave portions 93 slightly beyond the largest thickness of the ends towards the medial portions of the subunits 91,92.

FIG. 10 illustrates a portion of ribbon 100, which is another embodiment that is similar to ribbon 90. Ribbon 100 includes subunits 101,102 and a secondary matrix 105. Subunits 101,102 have a non-uniform thickness and secondary matrix 105 has plurality of recessed portions that are symmetrical about interface axis A—A, thereby forming a local minimum thickness t2. In this embodiment, local minimum thickness t2 is formed by having a radius $R_1$ of the subunit being less than an adjacent radius $R_2$ of the primary matrix, thereby forming a preferential tear portion. For example, local minimum thickness t2 can have a range of about zero to about 5 µm; however, any other suitable dimension can be used. Radii $R_1$ and $R_2$ are generally located adjacent to local minimum thickness t2. Configuring the ribbon so that $R_2$ is greater than $R_1$, is intended to allow primary matrix 105 material to generally flow away from local minimum thickness t2 before curing or hardening of the same. Rather than have primary matrix material flow towards, and building-up the thickness of local minimum thickness t2 before curing or hardening of the same. Additionally, other embodiments can also use this concept.

Many modifications and other embodiments of the present invention, within the scope of the appended claims, will become apparent to a skilled artisan. For example, subunits can include different numbers of optical fibers, ribbons can have more than two subunits, or the ribbons can have other suitable configurations. Additionally, ribbons of the present invention can be part of a ribbon stack or include other suitable components. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

That which is claimed:

1. A fiber optic ribbon comprising:
   a plurality of optical fibers, the plurality of optical fibers being arranged in a generally planar configuration; and
   a primary matrix, the primary matrix generally contacts and inhibits relative movement between the plurality of optical fibers along a longitudinal axis forming an elongate structure, the primary matrix having a first end portion and a medial portion, the primary matrix having non-uniform thickness, wherein the first end portion has a generally bulbous shape that is at least partially disposed over an edge optical fiber, the generally bulbous shape having a thickness, and the medial portion has a thickness, the thickness of the first end portion being greater than the thickness of the medial portion.

2. The fiber optic ribbon according to claim 1, the primary matrix further includes a second end portion having a thickness, the thickness of the second end portion being greater than the thickness of the medial portion.

3. The fiber optic ribbon according to claim 1 the thickness of the first end portion being about 5 µm or greater than thickness of the medial, portion.

4. The fiber optic ribbon according to claim 2, further comprising a secondary matrix contacting a portion of the primary matrix, the secondary matrix having a minimum thickness adjacent to the first end portion.

5. The fiber optic ribbon according to claim 1, the fiber optic ribbon being a first subunit, the first subunit being generally aligned along a plane with a second subunit, the first and second subunits having respective portions thereof contacting a secondary matrix.

6. The fiber optic ribbon according to claim 5, the second subunit a non-uniform thickness.

7. The fiber optic ribbon according to claim 1, further comprising a secondary matrix having a predetermined modulus contacting a portion of the primary matrix, the primary matrix having a predetermined modulus, and the modulus of the secondary matrix being different than the modulus of the primary matrix.

8. The fiber optic ribbon according to claim 1, further comprising a secondary matrix having at least one predetermined material characteristic contacting a portion of the primary matrix, the primary matrix having at least one predetermined material characteristic, and the at least one predetermined material characteristic of the secondary matrix being different than the at least one predetermined material characteristic of the primary matrix.

9. The fiber optic ribbon according to claim 1, the fiber optic ribbon being a subunit having a secondary matrix in contact therewith, the secondary matrix having a local minimum thickness, the subunit having a radius adjacent to the local minimum thickness, and the secondary matrix having a radius adjacent to the local minimum thickness, wherein the radius of the subunit is smaller than the radius of the secondary matrix.

10. The fiber optic ribbon according to claim 9, the local minimum being in the range of about zero to about 5 $\mu$m.

11. The fiber optic ribbon according to claim 1, a majority of the first end portion being disposed over an edge optical fiber.

12. The fiber optic ribbon according to claim 1, further comprising a secondary matrix that forms at least one generally planar surface.

13. A fiber optic ribbon comprising:
a first subunit, the first subunit including a plurality of optical fibers, the plurality of optical fibers being connected by a first primary matrix, the first primary matrix having a non-uniform thickness that is generally thicker near a first end portion;
a second subunit, the second subunit including a plurality of optical fibers, the plurality of optical fibers being connected by a second primary matrix; and
a secondary matrix contacting portions of the first and second subunits, the secondary matrix being dimensioned so as to provide a pair of opposing generally flat planar surfaces, the secondary matrix having a local minimum thickness adjacent to the non-uniform thickness of the first subunit, wherein during separation of the subunits the secondary matrix fractures adjacent to the local minimum thickness.

14. The fiber optic ribbon according to claim 13, second primary matrix having a non-uniform thickness.

15. The fiber optic ribbon according to claim 13, the first end portion of the first subunit having a generally bulbous shape.

16. The fiber optic ribbon according to claim 13, the first subunit having a second end, the first and second ends having generally bulbous shapes.

17. The fiber optic ribbon according to claim 13, the first subunit further includes medial portion and a second end, the first end has a predetermined thickness, the medial portion having a predetermined thickness, and the second end having a predetermined thickness, the thickness of the first and second ends being greater than the thickness of the medial portion.

18. The fiber optic ribbon according to claim 13, the secondary matrix having at least one predetermined material characteristics, and the first primary matrix having at least one predetermined material characteristic, wherein the at least one predetermined material characteristic of the secondary matrix is different than the at least one predetermined material characteristic of the first primary matrix.

19. The fiber optic ribbon according to claim 13, the first subunit having a radius adjacent to the local minimum thickness, and the secondary matrix having a radius adjacent to the local minimum thickness, wherein the radius of the subunit is smaller than the radius of the secondary matrix.

20. The fiber optic ribbon according to claim 19, the local minimum thickness being in the range of about zero to about 5 $\mu$m.

21. A fiber optic ribbon comprising:
a first subunit, the first subunit including a first plurality of optical fibers, the first plurality of optical fibers being contacted by a first primary matrix having a non-uniform thickness that is generally thicker near a first end portion;
a second subunit, the second subunit including a second plurality of optical fibers, the second plurality of optical fibers being contacted by a second primary matrix, the second primary matrix having a first end portion;
the first and second subunits being generally aligned along a plane;
a secondary matrix contacting portions of the first and second subunits, the secondary matrix having a non-uniform thickness; and
the secondary matrix having a recessed portion, the recessed portion being adjacent to an interface between the first end portion of the first subunit and the first end portion of the second subunit, the recessed portion defining a preferential tear portion.

22. The fiber optic ribbon according to claim 21, the recessed portion having a width of about 200 $\mu$m or greater.

23. The fiber optic ribbon according to claim 21, the recessed portion having a width that is less than about 600 $\mu$m.

24. The fiber optic ribbon according to claim 21, the first end portion of the first subunit having a generally bulbous shape.

25. The fiber optic ribbon according to claim 21, the first subunit further comprising a medial portion, the medial portion having a thickness, and the first end portion of the first subunit having a thickness, the thickness of the first and portion of the first subunit being greater than the thickness of the medial portion.

26. The fiber optic ribbon according to claim 25, the thickness of the first end portion being about 5 $\mu$m or greater than thickness of the medial portion.

27. The fiber optic ribbon according to claim 25, the first subunit having a radius adjacent to a local minimum thickness of the secondary matrix, and the secondary matrix having a radius adjacent to the local minimum thickness, wherein the radius of the subunit is smaller than the radius of the secondary matrix.

28. The fiber optic ribbon according to claim 21, the second subunit having a non-uniform thickness.

29. The fiber optic ribbon according to claim 21, the first end portion of the first subunit having a bulbous shape and the first end portion of the second subunit having a bulbous shape.

30. The fiber optic ribbon according to claim 21, second subunit having generally uniform thickness.

31. The fiber optic ribbon according to claim 21, the recessed portion being generally centered over the interface.

32. The fiber optic ribbon according to claim 21, the recessed portion being generally offset from the interface.

33. The fiber optic ribbon according to claim 32, the offset being in the range of about 125 μm to about 300 μm.

34. The fiber optic ribbon according to claim 21, the secondary matrix having at least one predetermined material characteristic, and the primary matrix of the first subunit having at least one predetermined material characteristic, wherein the at least one predetermined material characteristic of the secondary matrix is different than the at least one predetermined material characteristic of the primary matrix.

35. A fiber optic ribbon comprising:
   a plurality of optical fibers, the plurality of optical fibers being arranged in a generally planar configuration; and
   a primary matrix, the primary matrix having a first end portion, a second end portion, and a medial portion, the primary matrix generally contacts and inhibits relative movement between the plurality of optical fibers along a longitudinal axis, the primary matrix has a non-uniform thickness, wherein the first end portion has a thickness and the medial portion has a thickness, the thickness of the first end portion being greater than the thickness of the medial portion, and the first end portion is at least partially disposed about an edge optical fiber.

36. The fiber optic ribbon according to claim 35, a majority of the first end portion being disposed about an edge optical fiber.

37. The fiber optic ribbon according to claim 35, further comprising a secondary matrix that forms at least one generally planar surface.

38. A fiber optic ribbon comprising:
   a first subunit, the first subunit including a plurality of optical fibers, the plurality of optical fibers being surrounded by a first primary matrix;
   a second subunit, the second subunit including a plurality of optical fibers, the plurality of optical fibers being surrounded by a second primary matrix;
   a secondary matrix contacting portions of the first and second subunits, the secondary matrix having at least one generally planar surface;
   an interface, the interface, being defined between the first end portion of the first subunit and the first end portion of the second subunit;
   an interface axis, the interface axis generally passes through the interface and is generally perpendicular to the generally planar surface of the secondary matrix; and
   at least two recessed portions disposed within the secondary matrix, the at least two recessed portions being on opposite sides of the interface axis.

39. The fiber optic ribbon according to claim 38, the at least two recessed portion being generally symmetrical about the interface axis.

40. A fiber optic ribbon comprising:
   a first subunit, the first subunit including a plurality of optical fibers, the plurality of optical fibers being surrounded by a first primary matrix, the first primary matrix having non-uniform thickness that is generally thicker near a first end portion;
   a second subunit, the second subunit including a plurality of optical fibers, the plurality of optical fibers being surrounded by a second primary matrix;
   a secondary matrix contacting portions of the first and second subunits, the secondary matrix having at least one generally planar surface;
   an interface, the interface being defined between the first end portion of the first subunit and the first end portion of the second subunit;
   an interface axis, the interface axis generally passes through the interface and is generally perpendicular to the generally planar surface of the secondary matrix; and
   at least one recessed portion disposed within the secondary matrix, the at least one recessed portions being generally symmetrical about the interface axis.

* * * * *